(12) United States Patent
Morita (10) Patent No.: US 11,789,351 B2
(45) Date of Patent: Oct. 17, 2023

(54) IMAGE FORMING SYSTEM, IMAGE FORMING APPARATUS AND IMAGE READING APPARATUS

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 470 days.

(21) Appl. No.: 17/277,272

(22) PCT Filed: Sep. 6, 2019

(86) PCT No.: PCT/JP2019/035237
§ 371 (c)(1),
(2) Date: Mar. 17, 2021

(87) PCT Pub. No.: WO2020/059547
PCT Pub. Date: Mar. 26, 2020

(65) Prior Publication Data
US 2021/0263403 A1 Aug. 26, 2021

(30) Foreign Application Priority Data
Sep. 18, 2018 (JP) .................. 2018-174034

(51) Int. Cl.
*G03F 7/20* (2006.01)
*G03B 27/50* (2006.01)
(Continued)

(52) U.S. Cl.
CPC ......... *G03B 27/50* (2013.01); *G03B 27/6257* (2013.01); *G03G 21/1619* (2013.01); *H04N 1/0311* (2013.01); *G03G 2221/1654* (2013.01)

(58) Field of Classification Search
CPC ................ G03B 27/50; G03B 27/6257; G03G 21/1619; G03G 2221/1654; G03G 15/60;
(Continued)

(56) References Cited

U.S. PATENT DOCUMENTS 7,203,445 B2  4/2007 Uchida
7,538,914 B2  5/2009 Ando et al.
(Continued)

FOREIGN PATENT DOCUMENTS

JP  2003-209647 A  7/2003
JP  2005-026795 A  1/2005
(Continued)

*Primary Examiner* — Mesfin T Asfaw
(74) *Attorney, Agent, or Firm* — Studebaker & Brackett PC (57) ABSTRACT

An image forming system (100) includes an image forming apparatus (1) and an image reading apparatus (50). The image forming apparatus (1) include a first casing (10) including a top plate (13) having a first opening (11) and a second opening (12); and a fixing member (20) disposed below the top plate (13), having a first projecting part (21) and a second projecting part (22) and operated such that the first projecting part (21) is protruded and retracted through the first opening (11) and the second projecting part (22) is protruded and retracted through the second opening (12). The image reading apparatus (50) includes: a second casing (60) placed on the first casing (10); a second carriage (52) being movable inside the second casing (60); a lock member (70) which is engaged with the second carriage (52) to restrict movement of the second carriage (52), and when pushed up by the first projecting part (21), is disengaged from the second carriage (52) to release restriction of the movement of the second carriage (52); and a third opening (64) into which the second projecting part (22).

10 Claims, 6 Drawing Sheets (51) Int. Cl.
 *G03B 27/62* (2006.01)
 *G03G 21/16* (2006.01)
 *H04N 1/031* (2006.01)

(58) Field of Classification Search
 CPC . H04N 1/0311; H04N 1/00551; H04N 1/1065
 See application file for complete search history.

(56) References Cited

U.S. PATENT DOCUMENTS

| | | |
|---|---|---|
| 2004/0264998 A1 | 12/2004 | Uchida |
| 2005/0094218 A1 | 5/2005 | Ando |
| 2015/0242718 A1* | 8/2015 | Shibata .............. H04N 1/00551 |
| | | 358/1.12 |

FOREIGN PATENT DOCUMENTS

| JP | 2005-123777 A | 5/2005 |
|---|---|---|
| JP | 2007-292906 A | 11/2007 |

\* cited by examiner

IMAGE FORMING SYSTEM, IMAGE FORMING APPARATUS AND IMAGE READING APPARATUS

TECHNICAL FIELD

The present invention relates to a technique to couple an image forming apparatus with an image reading apparatus.

BACKGROUND

A multifunctional peripheral is known, in which an image forming apparatus and an image reading apparatus are coupled together to have a copying function, a facsimile function and the other functions. As a means for coupling the image forming apparatus with the image reading apparatus, an example is known, in which a casing of the image reading apparatus is placed on a casing of the image forming apparatus and then the casings are coupled together using screws. For example, Patent document 1 describes that a bracket is provided to adjust a height of the casing of the image reading apparatus to be coupled with the image forming apparatus. Patent document 2 describes that the casing of the image forming apparatus is provided with a hook while the casing of the image reading apparatus is provided with a hole with which the hook is engaged. When the casing of the image reading apparatus is placed on the casing of the image forming apparatus, the casing of the image reading apparatus is slid to engage the hook with the hole and the casings are coupled together.

PRIOR ART DOCUMENT

Patent Document

[Patent Document 1] Japanese Patent laid-open Publication No. 2007-292906

SUMMARY OF INVENTION

Problems to be Solved by the Invention

However, both the contents described in Patent documents 1 and 2 are intended to provide a product in which the image forming apparatus and the image reading apparatus are integrated with each other, to a user, and when a user purchases the image forming apparatus and the image reading apparatus separately and tries to couple them together later, a complicate work will be needed. Furthermore, owing to an impact generated when the image reading apparatus is coupled with the image forming apparatus, a moving frame of an optical unit in the image reading apparatus may be damaged.

In view of the above problem, it is an object of the present invention to provide an image forming system which makes it easy to couple the image forming apparatus with the image reading apparatus and prevents the moving frame of the optical unit of the image reading apparatus from being damaged, an image forming apparatus and an image reading apparatus.

Means of Solving the Problems

In order to solve the above problem, an image forming system according to the present invention includes an image forming apparatus and an image reading apparatus, wherein the image forming apparatus includes: a first casing including a top plate having a first opening and a second opening; and a fixing member disposed below the top plate, having a first projecting part and a second projecting part and operated such that the first projecting part is protruded and retracted through the first opening and the second projecting part is protruded and retracted through the second opening, the image reading apparatus includes: a second casing placed on the top plate of the first casing; a moving frame supporting an optical unit introducing reflected light reflected on a document to an imaging element, and being movable inside the second casing; a lock member which is engaged with the moving frame to restrict movement of the moving frame, and when pushed up by the first projecting part protruding through the first opening, is disengaged from the moving frame to release restriction of the movement of the moving frame; and a third opening formed in a bottom plate of the second casing and into which the second projecting part protruding through the second opening is inserted.

An image forming system according to the present invention includes: a first casing including a top plate having a first opening and a second opening; and a fixing member disposed below the top plate, having a first projecting part and a second projecting part and operated such that the first projecting part is protruded and retracted through the first opening and the second projecting part is protruded and retracted through the second opening.

An image reading apparatus according to the present invention includes: a second casing placed on a top plate of a first casing of an image forming apparatus; a moving frame supporting an optical unit introducing reflected light reflected on a document to an imaging element, and being movable inside the second casing; a lock member which is engaged with the moving frame to restrict movement of the moving frame, and when pushed up by a first projecting part protruding through a first opening of the top plate of the image forming apparatus, is disengaged from the moving frame to release restriction of the movement of the moving frame; and a third opening formed in a bottom plate of the second casing and into which a second projecting part protruding through a second opening of the top plate of the image forming apparatus is inserted.

Effect of the Invention

According to the present embodiment, it becomes possible to couple the image forming apparatus with the image reading apparatus easily and to prevent the carriage of the optical unit of the image reading apparatus from being damaged.

THE MODE FOR CARRYING OUT THE INVENTION

Hereinafter, an image forming system 100 according to one embodiment of the present invention will be described with reference to the drawings. The image forming system 100 includes a printer 1 (an example of an image forming apparatus) and a scanner 50 (an example of an image reading apparatus).

Figure 1:
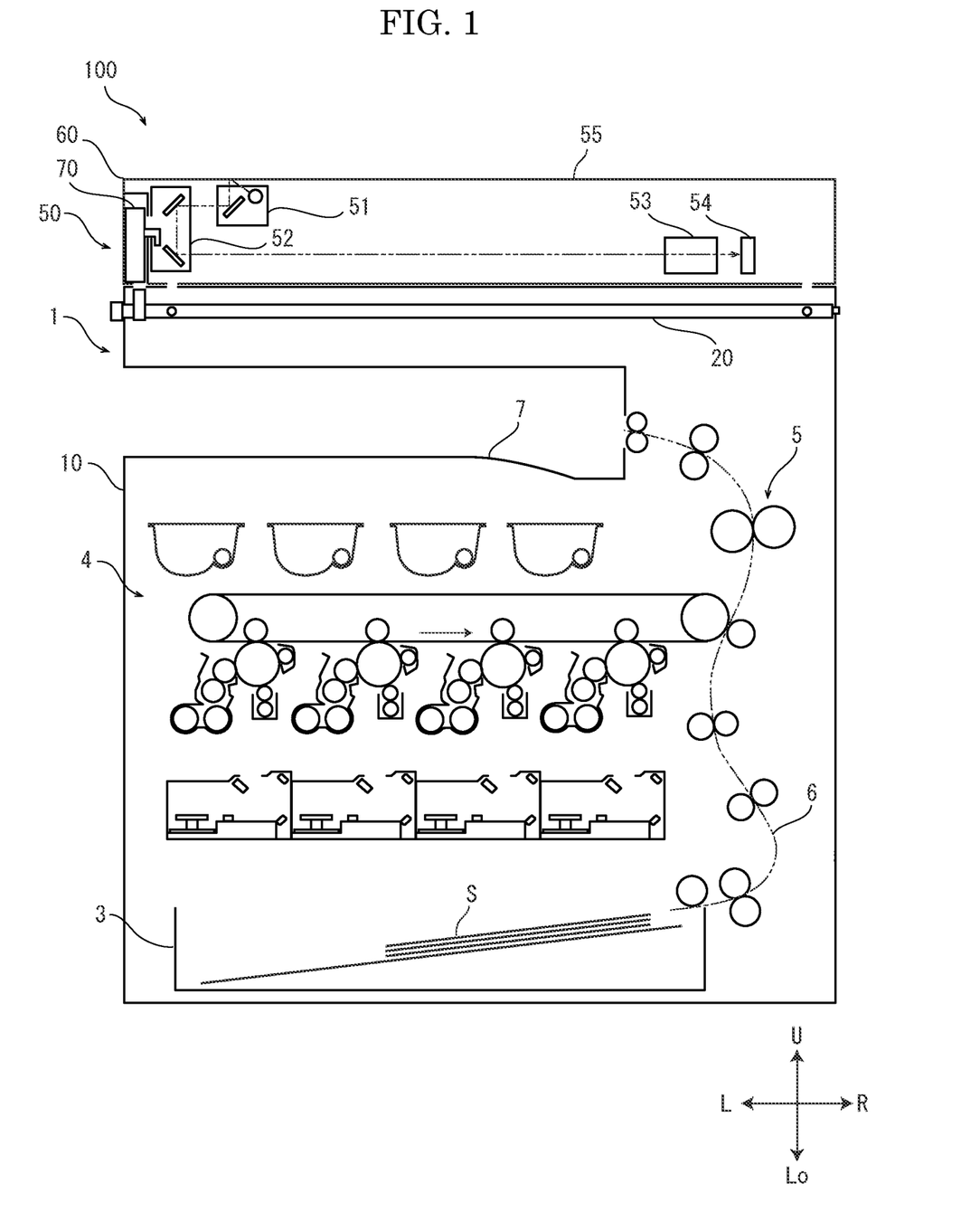
FIG. 1 is a front view schematically showing an inner structure of a color printer according to one embodiment of the present invention.

Firstly, with reference to FIG. 1, the entire structure of the printer 1 and the scanner 50 will be described. FIG. 1 is a front view schematically showing the inner structure of the printer 1 and the scanner 50. FIG. 1 shows the printer 1 and the scanner 50 which are coupled together, but the printer 1 and the scanner 50 can be driven independently without coupling them together. In the following description, a front side on a paper surface on which FIG. 1 is drawn is defined as a front side of the printer 1 and the scanner 50, and the left-and-right direction is based on a direction in which the printer 1 and the scanner 50 are shown from the front sides. In each figure, U, Lo, L, R, Fr and Rr respectively show an upper, a lower, a left, a right, a front and a rear.

The printer 1 includes a sheet feeding device 3 which feeds a sheet S stored therein to a conveyance path 6, an image forming part 4 which forms a full color toner image on the sheet S in an electrophotographic type image forming manner, a fixing device 5 which fixes the toner image on the sheet S and a discharge part 7 which discharges the sheet S on which the toner image is fixed.

When the printer receives an image data from an external computer or the others, the sheet feeding device 3 feeds the sheet S to the conveyance path 6, the image forming part 4 forms the toner image on the sheet S, the fixing device 5 fixes the toner image on the sheet S and the discharge part 7 discharges the sheet S.

The scanner 50 includes a first carriage 51 provided with a light source and a reflection mirror, a second carriage 52 (an example of a moving frame) provided with two reflection mirrors, a lens 53 which images a reflected light, an imaging element 54 which converts the imaged reflected light into an image signal, a contact glass 55 on which a document is placed and a pressing plate (not shown) which presses the document on the contact glass 55.

When reading is instructed to the scanner 50, the first carriage 51 is moved rightward at a speed V and the second carriage 52 is moved rightward at a speed V/2. The reflected light reflected on the document is reflected on the reflection mirror of the first carriage 51 and the reflection mirrors of the second carriage 52, introduced to the lens 53 and then imaged on the imaging element 54 to be converted into an image signal. The converted image signal is output to the printer 1 and then converted into the image date.

Figure 2A:
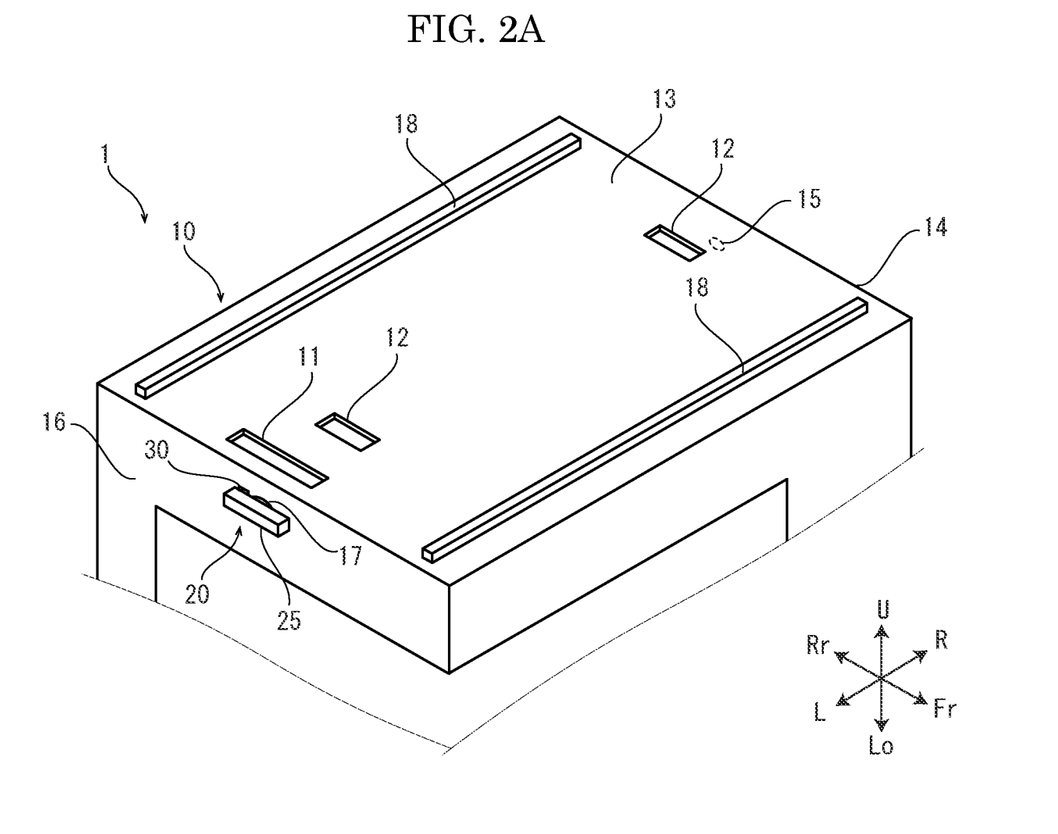
FIG. 2A is a perspective view showing the printer according to the embodiment of the present invention.
Figure 2B:
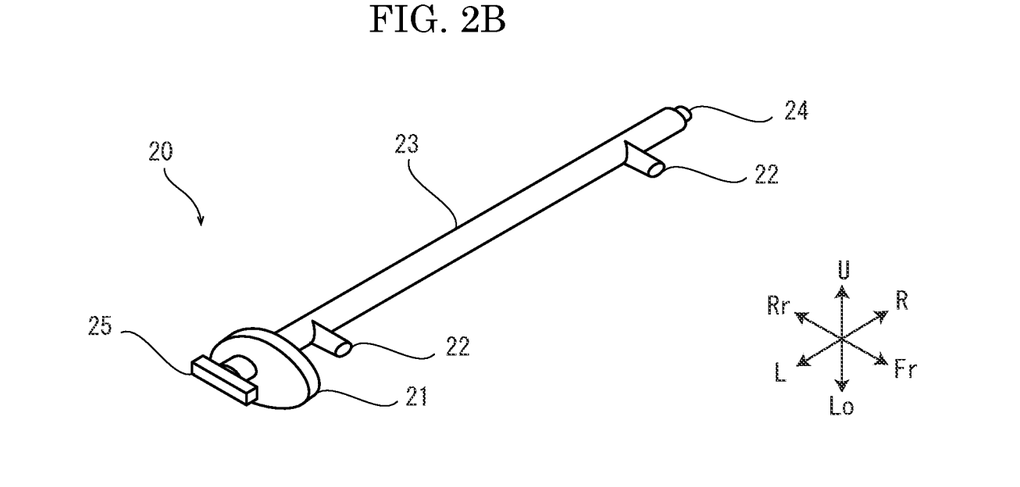
FIG. 2B is a perspective view showing a fixing member according to the embodiment of the present invention.
Figure 3A:
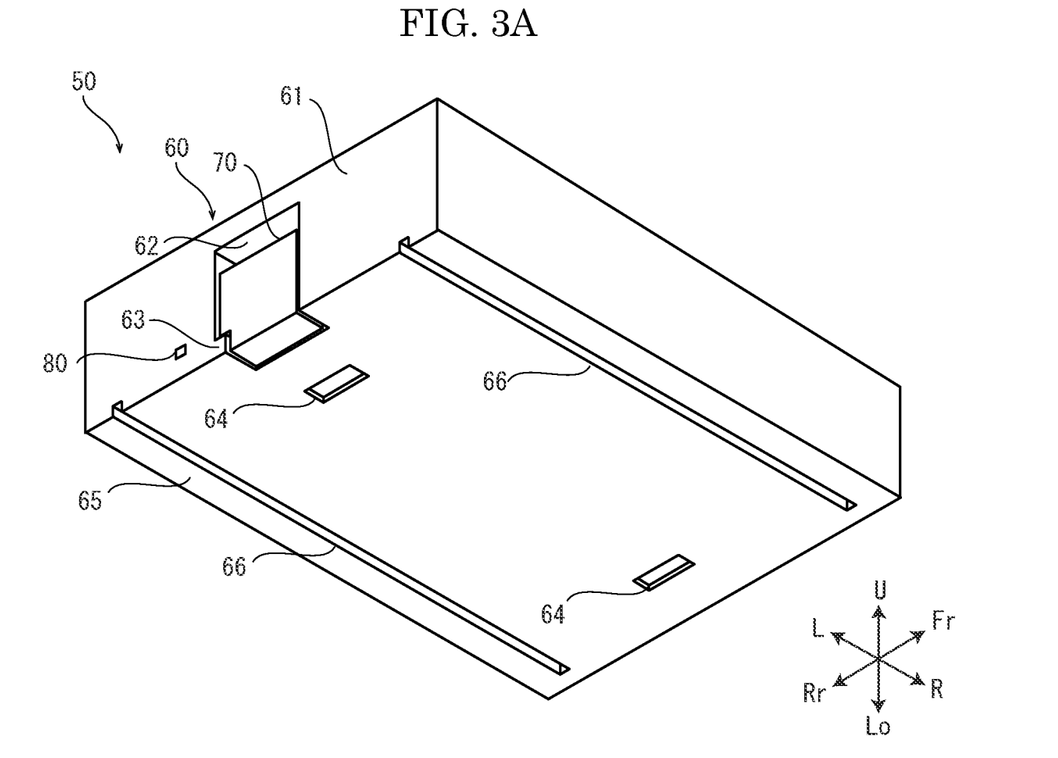
FIG. 3A is a perspective view showing a scanner according to the embodiment of the present invention.
Figure 3B:
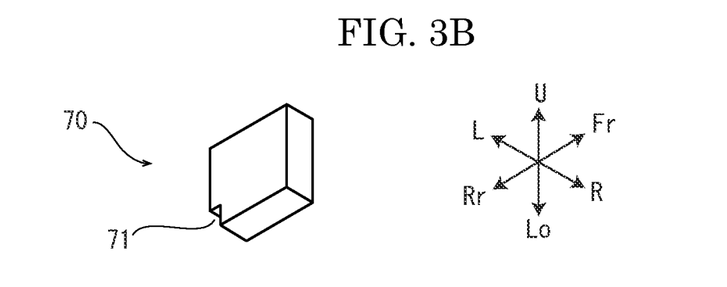
FIG. 3B is a perspective view showing a lock member according to the embodiment of the present invention.
Figure 3C:
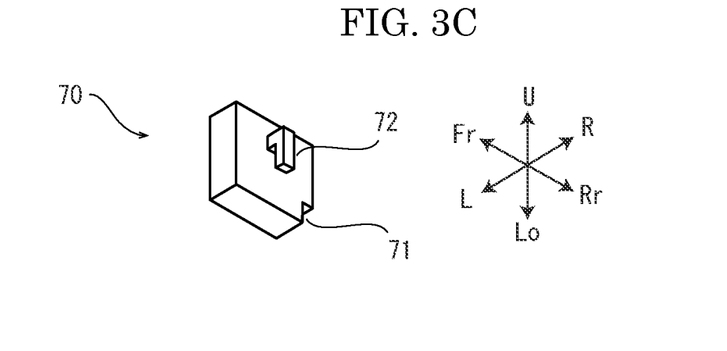
FIG. 3C is a perspective view showing the lock member according to the embodiment of the present invention.

Next, with reference to FIG. 1 to FIG. 3B, a configuration to couple the printer 1 with the scanner 50 will be described. FIG. 2A is a perspective view showing the printer 1. FIG. 2B is a perspective view showing a fixing member 20. FIG. 3A is a perspective view showing the scanner 50. FIG. 3B and FIG. 3C are perspective views showing a lock member 70.

The printer 1 includes a first casing 10 having a top plate 13 formed with a first opening 11 and a second opening 12, and a fixing member 20 disposed below the top plate 13. The scanner 50 includes a second casing 60 placed on the top plate 13 of the first casing 10, a lock member 70 engaged with the second carriage 52 to restrict the movement of the second carriage 52, and a third opening 64 formed in the bottom plate 65 of the second casing 60.

As shown in FIG. 2A, the first casing 10 of the printer 1 is formed into a parallelepiped shape, and the top plate 13 has the first opening 11 and two of the second opening 12. The first opening 11 is a rectangular hole whose longitudinal direction is along the front-and-rear direction, and formed near the left end portion of the top plate 13. The two second openings 12 are each a rectangular hole whose longitudinal direction is along the front-and-rear direction, and formed on a right side of the first opening 11 and near the right end portion of the top plate 13. A right side plate 14 has a hole 15. A left side plate 16 has a hole 17.

As shown in FIG. 2B, the fixing member 20 has a shaft part 23 whose longitudinal direction is along the left-and-right direction, and is disposed below the top plate 13. At the right end portion of the shaft part 23, a boss 24 is formed. The boss 24 is supported by the hole 15 of the right side plate 14 of the first carriage 10. At the left end portion of the shaft part 23, a grip 25 is formed. The left end portion of the shaft part 23 is passed through the hole 17 of the left side plate 16 of the first carriage 10, and the grip 25 is disposed outside the left side plate 16 of the first casing 10.

The fixing member 20 has a first projecting part 21 and second projecting parts 22. The first projecting part 21 is an eccentric cam, and the second projecting parts 22 is each formed into a pin-like shape projecting from the shaft part 23 in a direction of the largest diameter portion of the first projecting part 21. The first projecting part 21 and the second projecting parts 22 are disposed at positions corresponding to the first opening 11 and the second openings 12 respectively. The fixing member 20 is operated such that the first projecting part 21 is protruded and retracted through the first opening 11 and the second projecting parts 22 are protruded and retracted through the second openings 12. Specifically, when the grip 25 is operated in the counterclockwise direction, the first projecting part 21 is protruded through the first opening 11 and the second projecting parts 22 are protruded through the second openings 12. When the grip 25 is operated in the clockwise direction in a state where the first projecting part 21 and the second projecting parts 22 are protruded, the first projecting part 21 is retracted through the first opening 11 and the second projecting parts 22 are retracted through the second openings 12.

On both the front and rear end portions of the upper face of the top plate 13, rails 18 (a guide part) whose longitudinal direction is along the left-and-right direction are formed. On the outer face of the left side plate 16 of the first casing 10, a connector 30 which outputs the image signal converted from the reflected light is disposed. The connector 30 is disposed so as to be covered with the grip 25 in a state where the first projecting part 21 and the second projecting parts 22 are not protruded through the first opening 11 and the second openings 12. When an operation to protrude the first projecting part 21 and the second projecting parts 22 is performed by using the grip 25, the connector 30 is exposed.

Figure 4A:
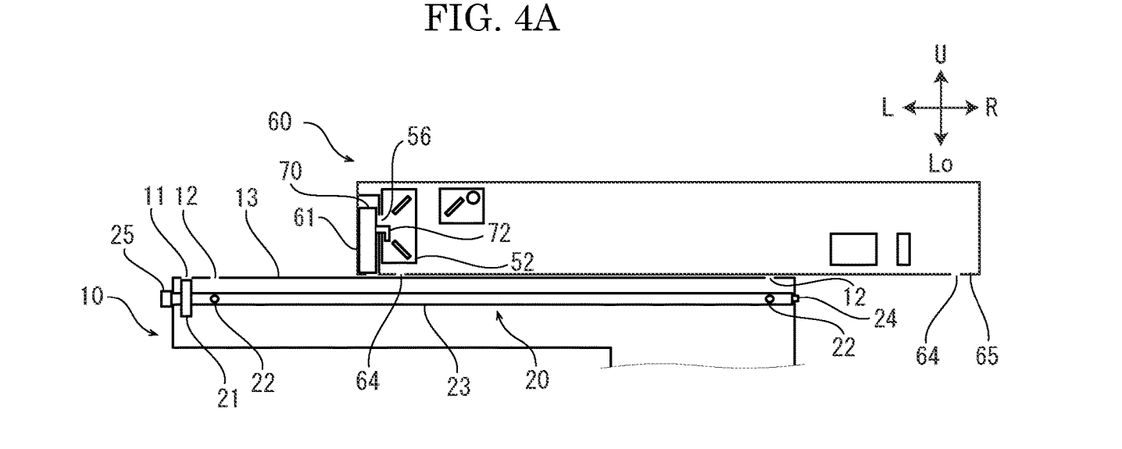
FIG. 4A is a perspective view showing the scanner during moving according to the embodiment of the present invention.

As shown in FIG. 3A, the second casing 60 of the scanner 50 is formed into a parallelepiped shape, and in the left end portion thereof, the lock member 70 is disposed. In FIG. 3A, for convenience of illustration, the left side face of the lock member 70 is exposed, but in practice, as shown in FIG. 4A, the left side face of the lock member 70 is covered with the left side plate 61. As shown in FIG. 3B and FIG. 3C, the lock member 70 is a parallelepiped shape in which a cutout portion 71 is formed in the lower end portion of the rear end portion. The left side plate 61 of the second casing 60 has a concave part 62 in which the lock member 70 is stored. The concave part 62 has a size in the upper-and-lower direction larger than that of the lock member 70. At a position corresponding to the cutout portion 71 of the lock member 70 in the concave part 62, a protruding step 63 is formed so as to restrict the downward movement of the lock member 70. When the protruding step 63 comes into contact with the cutout portion 71, the apex portion of the lock member 70 is separated away from the roof portion of the concave part 62, and the lock member 70 is slidable upward. On the right side face of the lock member 70, a hook-shaped projection 72 bending downward is formed.

Third openings 64 are each a rectangular hole whose longitudinal direction is along the front-and-rear direction, and are formed in the bottom plate 65 at positions corresponding to the second openings 12 of the first casing 10. Into the third openings 64, the second projecting parts 22 of the fixing member 20 protruding through the second openings 12 of the first casing 10 are inserted.

On both the front and rear end portions of the lower face of the bottom plate 65, grooves 66 (a guide part) whose longitudinal direction is along the left-and-right direction are formed. The groove 66 has a shape corresponding to the rail 18 of the first casing 10. On the outer face of the left side plate 61 of the second casing 60, a connector 80 is disposed.

Next, with reference to FIG. 4A to 5B, a way to couple the printer 1 with the scanner 50 will be described.

Figure 5A:
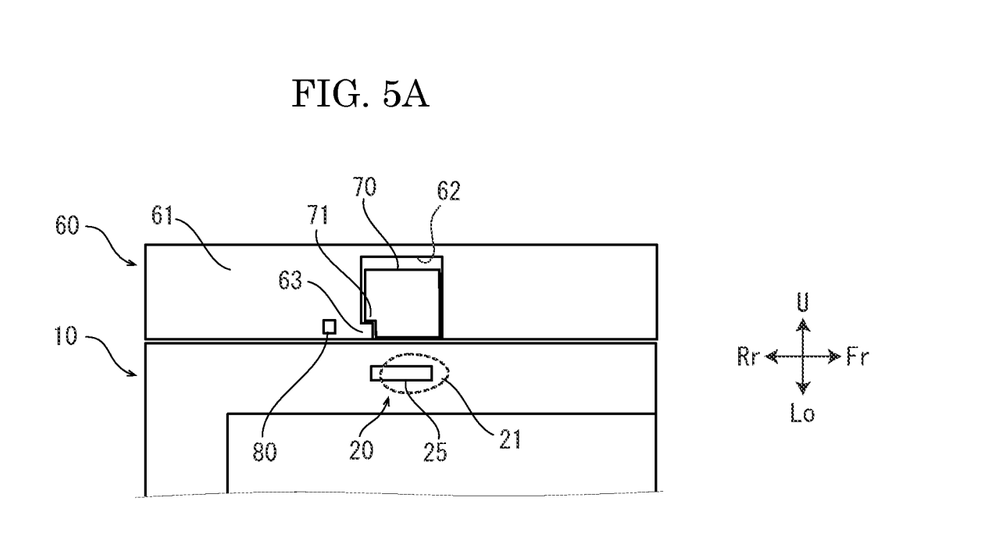
FIG. 5A is a perspective view showing the scanner before the coupling according to the embodiment of the present invention.
Figure 5B:
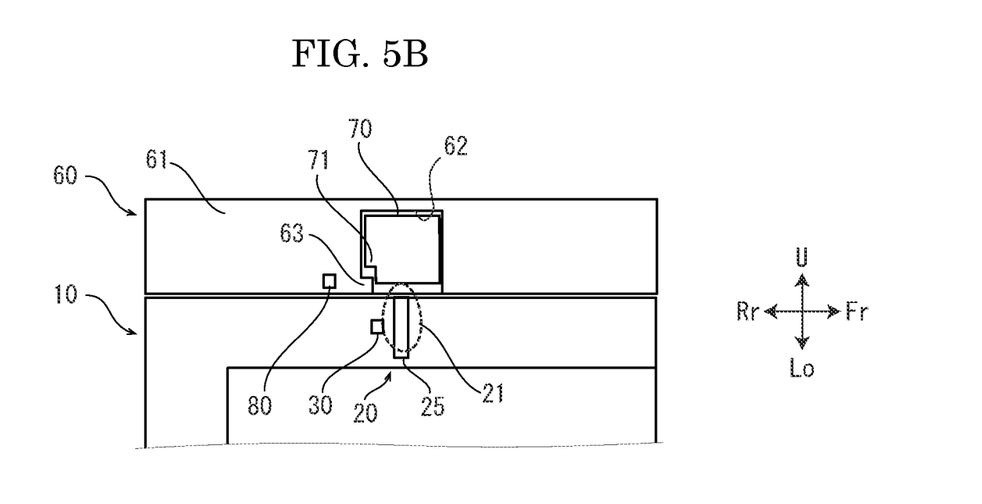
FIG. 5B is a perspective view showing the scanner after the coupling according to the embodiment of the present disclosure.

Firstly, as shown in FIG. 4A, a user places the scanner 50 on the top plate 13 of the first casing 10 of the printer 1. The user fits the rails 18 of the first casing 10 into the grooves 66 of the second casing 60, and then moves the second casing 60 leftward. At this time, the leftward movement of the second casing 60 is guided by the rails 18. The second carriage 52 has a hole 56. The projection 72 of the lock member 70 is engaged with the hole 56 of the second carriage 52, and the movement of the second carriage 52 in the second casing 60 is restricted. As shown in FIG. 5A, the cutout portion 71 of the lock member 70 comes into contact with the protruding step 63 of the second casing 60, and the downward movement of the lock member 70 is restricted. In FIG. 5A and FIG. 5B, for convenience of illustration, the left side face of the lock member 70 is exposed, but in practice, as shown in FIG. 4A, the left side face of the lock member 70 is covered with the left side plate 61.

Figure 4B:
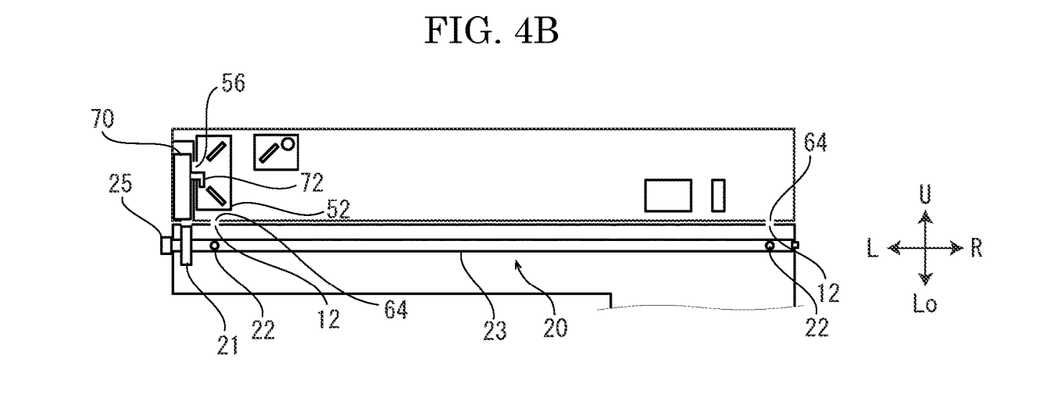
FIG. 4B is a perspective view showing the scanner after the moving according to the embodiment of the present invention.

Next, as shown in FIG. 4B, the user stops the movement of the second casing 60 at a position where the left side face of the first casing 10 is on the same plane as the left side face of the second casing 60.

Figure 4C:
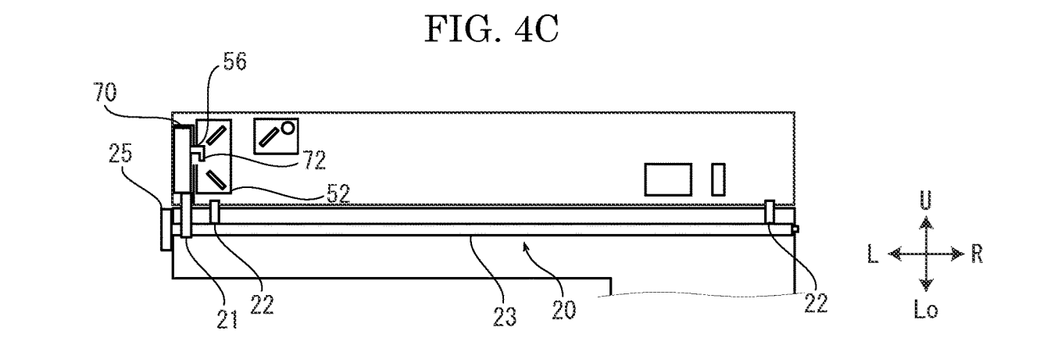
FIG. 4C is a perspective view showing the scanner coupled with the printer according to the present invention.

Next, as shown in FIG. 4C and FIG. 5B, the user grips the grip 25 of the fixing member 20 and rotates the fixing member 20 in the counterclockwise direction. Then, the second projecting parts 22 are protruded through the second openings 12 and inserted into the second openings 64. As a result, the second casing 60 is fixed to the first casing 10. At the same time, the first projecting part 21 pushes up the lock member 70 to disengage the projection 72 from the hole 56, and the restriction of the movement of the second carriage 52 is released. Furthermore, the connector 30 covered with the grip 25 is exposed.

Next, the user connects the connector 30 of the first casing 10 to the connector 80 of the second casing 60 with a cable (not shown). This connection makes it possible to output the image signal from the scanner 50 to the printer 1.

According to the above described image forming system 100 of the present embodiment, the operation of the lock member 70 makes it possible to perform the coupling of the scanner 50 with the printer 1 and the release of the restriction of the movement of the second carriage 52 at the same time. During the coupling operation of the scanner 50, the movement of the second carriage 52 in the first casing 10 is restricted, and at the same time when the scanner 50 is coupled with the printer 1, the restriction of the movement of the second carriage 52 is released. Accordingly, according to the image forming system 100 of the present embodiment, it becomes possible to couple the printer 1 with the scanner 50 easily and to prevent the second carriage 52 of the optical unit of the scanner 50 from being damaged.

According to the image forming system 100 of the present embodiment, it becomes possible to electrically connect the scanner 50 with the printer 1 after the scanner 50 is fixed to the printer 1, so that incorrect operation of the printer 1 and the scanner 50 can be prevented.

Furthermore, according to the image forming system 100 of the present embodiment, the rails 18 of the first casing 10 are fitted into the grooves 66 of the second casing 60, and then the second casing 60 is guided with respect to the first casing 10 to a predetermined position. As a result, the first projecting part 21 and the second projecting parts 22 are positioned below the lock member 70 and the third openings 64 respectively. Accordingly, it becomes possible to position the second casing 60 with respect to the first casing 10 easily.

The above embodiment may be modified as follows.

Figure 6A:
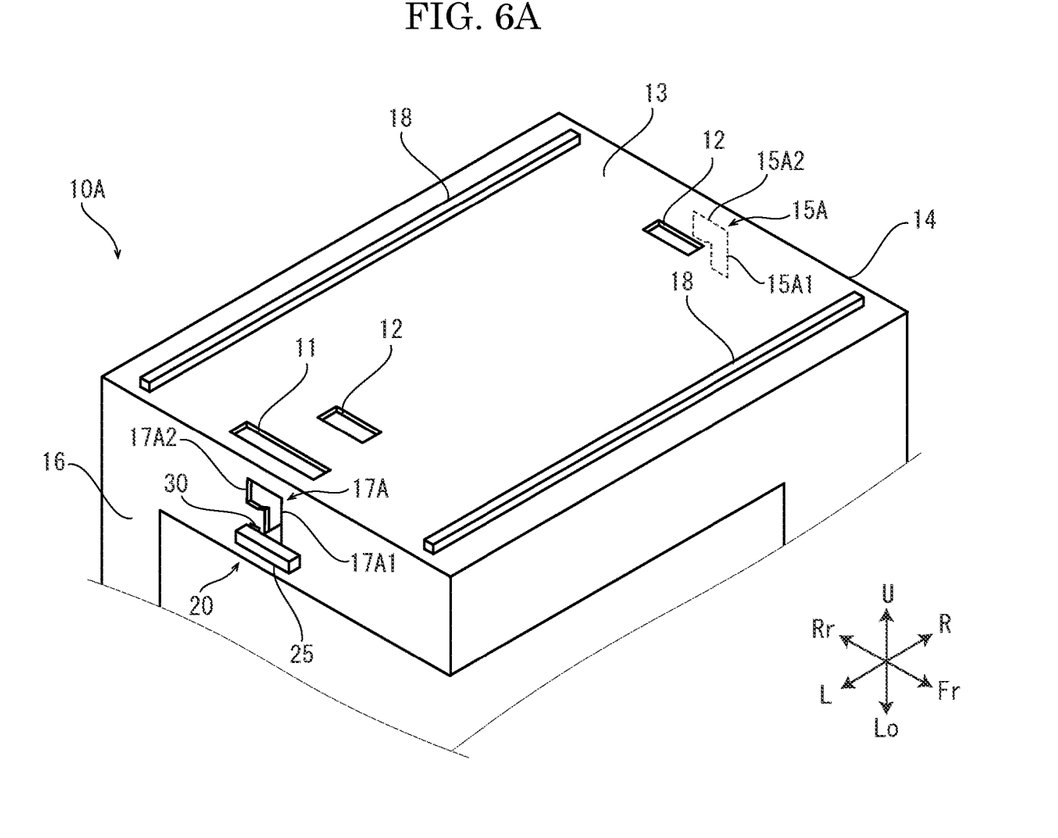
FIG. 6A is a perspective view showing the printer according to a modified example of the embodiment of the present invention.
Figure 6B:
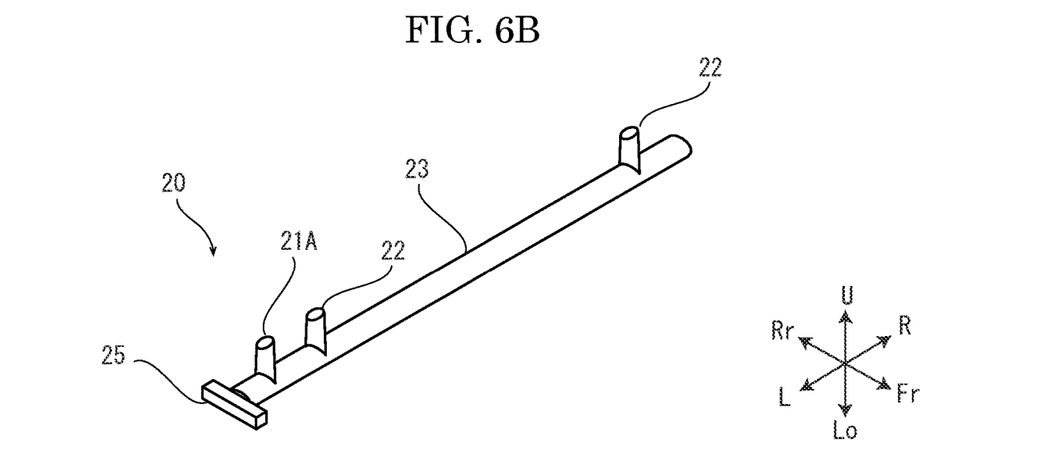
FIG. 6B is a perspective view showing the lock member according to the modified example of the embodiment of the present invention.

In the above embodiment, the fixing member 20 is configured to be rotated, but the fixing member 20 may be configured to be moved. For example, in the example shown in FIG. 6A and FIG. 6B, hook-shaped openings 15A and 17A are formed in the right side plate 14 and the left side plate 16 of the first casing 10, and the left and right end portions of the shaft part 23 of the fixing member 20 are supported by the openings 15A and 17A. The openings 15A and 17A have first portions 15A1 and 17A1 extending in the upper-and-lower direction and second portions 15A2 and 17A2 extending in the front-and-rear direction from the upper end portions of the first portions 15A1 and 17A1. The lower end portions of the second portions 15A2 and 17A2 are formed such that their front portions are lower than their rear portions. The shaft part 23 has the first projecting part 21A in the same manner as the second projecting part 22 at a position corresponding to the first opening 11. The fixing member 20 is supported by the openings 15A and 17A with the first projecting part 21A and the second projecting parts 22 projecting upward. When the scanner 50 is coupled with the printer 1, the fixing member 20 is moved upward along the first portions 15A1 and 17A1. Then, the second projecting parts 22 are inserted into the second openings 12 and the first projecting part 21A pushes up the lock member 70. Next, the fixing member 20 is moved rearward along the second portions 15A2 and 17A2, and then the fixing member 20 is fixed to the second portions 15A2 and 17A2.

In the above embodiment, the fixing member 20 is operated so as to expose the connector 30, but the connectors may be formed in the top plate 13 of the first casing 10 and the bottom plate 65 of the second casing 60, and when the second casing 60 is moved to a position shown in FIG. 4B, the connector of the first casing 10 may be connected to the connector of the second casing 60.

The above embodiment shows the example where the rails 18 are provided in the top plate 13 of the first casing 10 and the grooves 66 are provided in the bottom plate 65 of the second casing 60. However, the top plate 13 of the first casing 10 may be formed to have a concave shape where its center portion is recessed downward with respect to its front and rear end portions and the bottom plate 65 of the second casing 60 may be formed to have a convex shape corresponding to the concave shape of the top plate 13 of the first casing 10. That is, the upper face of the top plate 13 of the first casing 10 and the lower face of the bottom plate 65 of the second casing 60 may be formed so as to guide the second casing 60 in one direction along the upper face of the top plate 13.

The invention claimed is:

1. An image forming system comprising an image forming apparatus and an image reading apparatus, wherein
the image forming apparatus includes:
a first casing including a top plate having a first opening and a second opening; and
a fixing member disposed below the top plate, having a first projecting part and a second projecting part and operated such that the first projecting part is protruded and retracted through the first opening and the second projecting part is protruded and retracted through the second opening,
the image reading apparatus includes:
a second casing placed on the top plate of the first casing;
a moving frame supporting an optical unit introducing reflected light reflected on a document to an imaging element, and being movable inside the second casing;
a lock member which is engaged with the moving frame to restrict movement of the moving frame, and when pushed up by the first projecting part protruding through the first opening, is disengaged from the moving frame to release restriction of the movement of the moving frame; and
a third opening formed in a bottom plate of the second casing and into which the second projecting part protruding through the second opening is inserted.

2. The image forming system according to claim 1, wherein
the fixing member has a grip,
the first casing has a connector disposed at a position covered with the grip, and outputting an image signal converted from the reflected light, and
when an operation to protrude the fixing member through the first opening is performed by using the grip, the connector is exposed.

3. The image forming system according to claim 1, wherein
the fixing member is supported by the first casing in a rotatable manner, and the fixing member is rotated to protrude and retract the first projecting part and the second projecting part through the first opening and the second opening respectively.

4. The image forming system according to claim 1, wherein
guide parts which guide the second casing in one direction along the upper face of the top plate are formed on an upper face of the top plate of the first casing and on a lower face of the bottom plate of the second casing.

5. The image forming system according to claim 4, wherein
the guide part formed on the upper face of the top plate of the first casing is a rail along the one direction,
the guide part formed on the lower face of the bottom plate of the second casing is a groove into which the rail is fitted, and
when the second casing is guided by the guide parts with respect to the first casing to a predetermined position, the first projecting part and the second projecting part are positioned below the lock member and the third opening respectively.

6. The image forming system according to claim 1, wherein
the lock member has:
a projection engaged with a hole formed in the moving frame; and
a cutout portion engaged with a protruding step provided in the second casing to restrict downward movement of the lock member, and
when the lock member is pushed up by the first projecting part protruding through the first opening, the projection is separated away from the hole and disengaged from the moving frame.

7. The image forming system according to claim 1, wherein the first projecting part is an eccentric cam fixed to a shaft part, and
the second projecting part is formed into a pin-like shape protruding from the shaft part radially in a direction of a largest diameter portion of the first projecting part.

8. The image forming system according to claim 1, wherein
the second projecting part is inserted into the third opening so that the second casing is positioned with respect to the first casing.

9. An image forming apparatus comprising:
a first casing including a top plate having a first opening and a second opening; and
a fixing member disposed below the top plate, having a first projecting part and a second projecting part and operated such that the first projecting part is protruded and retracted through the first opening and the second projecting part is protruded and retracted through the second opening.

10. An image reading apparatus comprising:
a second casing placed on a top plate of a first casing of an image forming apparatus;
a moving frame supporting an optical unit introducing reflected light reflected on a document to an imaging element, and being movable inside the second casing;
a lock member which is engaged with the moving frame to restrict movement of the moving frame, and when pushed up by a first projecting part protruding through a first opening of the top plate of the image forming apparatus, is disengaged from the moving frame to release restriction of the movement of the moving frame; and
a third opening formed in a bottom plate of the second casing and into which a second projecting part protruding through a second opening of the top plate of the image forming apparatus is inserted.

* * * * *